US009211037B2

(12) United States Patent
Goehring et al.

(10) Patent No.: US 9,211,037 B2
(45) Date of Patent: Dec. 15, 2015

(54) MAGNETIC SMOKER BOX AND PACKAGING THEREFOR

(75) Inventors: David Warren Goehring, Lodi, CA (US); Mark Simor Edson, Lodi, CA (US); James Earl Blincoe, Lodi, CA (US)

(73) Assignee: Woodbridge Grilling Company Inc, Lodi, CA (US)

( * ) Notice: Subject to any disclaimer, the term of this patent is extended or adjusted under 35 U.S.C. 154(b) by 2202 days.

(21) Appl. No.: 12/009,254

(22) Filed: Jan. 16, 2008

(65) Prior Publication Data

US 2008/0168979 A1 Jul. 17, 2008

Related U.S. Application Data

(60) Provisional application No. 60/880,217, filed on Jan. 16, 2007.

(51) Int. Cl.
*A23B 4/03* (2006.01)
*A23B 4/044* (2006.01)
*B60H 3/00* (2006.01)
*A47J 37/07* (2006.01)
*A23B 4/052* (2006.01)

(52) U.S. Cl.
CPC .......... *A47J 37/0786* (2013.01); *A23B 4/0523* (2013.01)

(58) Field of Classification Search
CPC ............. A47J 37/0786; A47J 37/0704; A23B 4/0523; A23B 4/052
USPC ........... 99/482, 340, 352, 448, 450, 467, 473; 220/230, 745; 70/276; 292/251.5; 426/315; 206/350, 524.6, 525, 818
See application file for complete search history.

(56) References Cited

U.S. PATENT DOCUMENTS

| 3,651,796 A * | 3/1972 | Nelson .......................... 126/215 |
| D283,588 S | 4/1986 | Stuckey |
| 4,779,525 A | 10/1988 | Gaines |
| 4,827,852 A * | 5/1989 | Piontkowski ................. 110/211 |
| 5,048,406 A | 9/1991 | Cofer |
| 5,167,183 A | 12/1992 | Schlosser et al. |
| 5,195,423 A * | 3/1993 | Beller ............................. 99/340 |
| 5,987,715 A * | 11/1999 | Khon ............................... 24/303 |
| 5,996,831 A * | 12/1999 | Teok ............................. 220/230 |
| 6,019,035 A | 2/2000 | Jonas et al. |
| 6,059,849 A | 5/2000 | Lewis |
| 6,102,028 A | 8/2000 | Schlosser et al. |

(Continued)

FOREIGN PATENT DOCUMENTS

JP 4-36157 2/1992

*Primary Examiner* — Eric Stapleton
(74) *Attorney, Agent, or Firm* — Donald E. Schreiber

(57) ABSTRACT

A compact, openable and closeable barbeque smoker box receives and encloses woodchips and is easily disposed within a barbeque and emits smoke from the woodchips while grilling food. The smoker box includes an open bottom pan and a openable and closeable lid pan. The lid is pierced by at least one hole to vent smoke from the smoker box while grilling food. A magnet included in the smoker box facilitates securing the lid together with the bottom pan attached thereto beneath a grilling surface of a barbeque. Also disclosed is a sealable container specifically adapted for receiving the smoker box together with a quantity of woodchips beneath the smoker box. The container facilitates removing a smoker box stored therein regardless of the amount of woodchips remaining in the container.

16 Claims, 3 Drawing Sheets

(56) References Cited

U.S. PATENT DOCUMENTS

| | | | |
|---|---|---|---|
| 6,289,795 B1 * | 9/2001 | McLemore et al. | 99/400 |
| 6,481,344 B1 | 11/2002 | Green et al. | |
| 6,971,305 B1 | 12/2005 | Thomas | |
| D518,728 S | 4/2006 | Frantz | |
| D534,034 S | 12/2006 | Chambers | |
| 2002/0166460 A1 * | 11/2002 | O'Shea | 99/482 |
| 2004/0025714 A1 * | 2/2004 | Neal et al. | 99/482 |
| 2007/0266863 A1 | 11/2007 | Frigo | |

* cited by examiner

MAGNETIC SMOKER BOX AND PACKAGING THEREFOR

CLAIM OF PROVISIONAL APPLICATION RIGHTS

This patent application claims the benefit of U.S. Provisional Patent Application No. 60/880,217 filed on Jan. 16, 2007.

BACKGROUND

1. Technical Field

The present disclosure relates generally to outdoor cooking devices and, more particularly, to smoker box accessories for barbeques.

2. Background Art

Wood-fired grilling has become virtually non-existent in today's outdoor cooking. In recent years, grilling is primarily done using either gas fired or charcoal barbeques. What is missing from gas fired or charcoal barbeques are flavors given off by burning hardwoods. In addition to the popularity of outdoor grilling, various different ways of adding flavor to grilled food are also popular. One way of adding flavor to grilled food employs various types of devices to burn a smoke emitting material, e.g. woodchips and/or spices, during grilling. In this way smoke from such burning material fills a grilling chamber and penetrates the food thereby giving the food additional flavor.

Currently woodchips are commercially available for use in grilling. However, using loose woodchips requires constructing an aluminum or tin foil smoking tray (pouch) that is pierced by holes to release the smoke. Furthermore, many of these products require presoaking the woodchips in water for an interval of time. In addition to loose woodchips, there exist some packaged products that include a metallic container for the woodchips in addition to the woodchips themselves.

However, when a woodchip filled container is placed on top of a grilling surface unless the fire is extremely hot the woodchips fail to smoke due to insufficient heat. When exposed to extreme heat food often becomes over-cooked. Furthermore, extreme heat sears food too quickly which impedes smoke penetration. Some products permit placing the woodchip container below the grilling surface. However, most gas fired barbeques have curved or slanted plates over their burners which impedes placing a woodchip container beneath the grilling surface. Alternatively, a barbeque's charcoal can be arranged to provide a flat area for a woodchip container near the burning charcoal. However, in this location extreme heat from burning charcoal can quickly consume the woodchip container, and often consume the woodchips placed therein faster than desired.

United States Patent Application Pub. No. 20070266863 ("the '863 patent application") discloses a preferably triangularly shaped smoker attachment that directly contacts a gas fired barbeque's heat source, i.e. its inverted V-shaped sear bars. Specifically, the disclosed smoker attachment replaces one or more of the sear bars inside a gas fired barbeque that are located between the gas burners in the lower section of the barbeque and the cooking grid. The smoker attachment may be supported in this location by existing sear bar supports. Since in this location the smoker device directly contacts the heat source, and since most gas fired barbeques have 2 or 3 separately controllable burners and only one burner is required for the smoker attachment, the '863 patent application alleges that it is possible to consistently control heat needed for producing a steady source of smoke for effectively flavoring food while permitting foods to be smoked at comparatively low temperature.

U.S. Pat. No. 6,971,305 discloses a disposable smoke generating cartridge having a multiple perforation top that is prefilled with wood pellets. A reusable cartridge holder made of a non-combustible material such as metal or ceramic holds the smoke generating cartridge upright. The bottom of the cartridge is combustible and resting thereon within the cartridge is tinder material. Smoke production begins by igniting the cartridge's bottom which starts the tinder burning that in turn ignites the pellets. Although the bottom and the tinder burn away, the pellets do not full fall through because, due to released heat and moisture, they swell and press together and against the cartridge's surrounding wall. Held in this way, there remains adequate interstitial spaces among the wood pellets for airflow and smoke production. The assembled cartridge and cartridge holder are preferably positioned away from the burning coals but where the smoke will permeate the food.

U.S. Pat. No. 6,481,344 discloses a vented container filled with dry organic material such as woodchips, and also, perhaps, flavor capsules that contain spices and some water. One perforation in the container enables the container to become pressurized so smoke leaves the container in a controlled direction and at a velocity that does not cause combustion. Upon heating, the water in the flavor capsules vaporizes thereby permitting spices to intermingle with the flavored smoke. The capsules do not pre-soak the woodchips, rather it only creates water vapor for flavored spices present in the capsules. In this way, the organic material remains dry and burns.

U.S. Pat. No. 6,102,028 ("the '028 patent") discloses a smoker attachment that may be placed on top of sear bars in existing gas fired barbeques. The smoker attachment includes a container adapted for receiving smoker particles, i.e. woodchips, that includes side walls, a bottom wall, and a hinged top cover. The container's bottom wall is segmented into a plurality of sections by comparatively large, rectangularly shaped openings that extend across the entire bottom wall. Inverted V-shaped openings in the attachment's side walls extend the bottom wall's opening upward toward the top cover. These openings in the bottom wall and side walls mate with sear bars, i.e. conductive members, that are located between a gas fired barbeque's burner assembly and its cooking grid. Configured in this way, upon the smoker attachment's installation in the barbeque the sear bars close the bottom wall and side walls openings and form a portion of the attachment's bottom wall. Comparatively smaller apertures that also pierce the attachment's bottom wall sections and its hinged top cover allow the entry of air from below and release smoke through the hinged top cover.

U.S. Pat. No. 6,059,849 discloses a disposable container that contains pre-soaked woodchips. A disadvantage of this approach is that the woodchips have a tendency to become waterlogged which inhibits producing smoke quickly. Furthermore, since the woodchips are organic matter it may be necessary to treat the container's contents to prevent them from molding.

U.S. Pat. No. 6,019,035 ("the '035 patent") discloses an elongate, cylindrically-shaped food smoker having a hollow interior adapted for receiving woodchips. The food smoker's wall is pierced by a plurality of apertures positioned in the top ⅓ of the cylinder. A pair of detachable end caps 30 close opposite ends of the cylinder. Each of the end caps 30 has an arcuate hanging loop for suspending the cylinder 20 above a barbeque's heat source. The cylinder 20 may be suspended either from the grates of a grilling surface, or from a barbeque's lid. Suspended in this way, the food smoker may be positioned to control the woodchips' burning and the amount of smoke rather than by changing the heat. The '035 patent states that this is particularly advantageous where a very high heat is required for a particular kind of cooking, such as searing meat.

Similar to the '028 patent, U.S. Pat. No. 5,167,183 discloses a smoker attachment for a gas fired barbeque. Also similar to the '028 patent, the disclosed smoker attachment includes a hinged top cover and openings formed in a segmented bottom wall that mate with the barbeque's sear bars. In addition to receiving woodchips, the disclosed smoker attachment may also receive a water tray thereby adapting it for smoking food.

U.S. Design Pat. Des. 283,588 discloses a cast iron smoking box having a perforated, removable lid. Removing the lid permits filling the smoking box with pre-soaked woodchips. For a charcoal barbeque, the smoking box is placed upon the burning charcoal. For a gas fired barbeque, the smoking box may be placed beneath the food grate of the grilling surface if there is sufficient room, or if there is insufficient room on top of the grate.

While various barbeque smoker devices have received much consumer interest, they do not always produce the desired result in effectively providing the smoke required for flavoring food. The device's apparent inability to produce smoke required for flavoring food is primarily due to controlling the amount of heat needed to ignite woodchips. In general, if a device does not directly contact a gas fired barbeque's the heat source, the burners must be set at a high temperature to create sufficient heat to make the woodchips smoke. A high temperature within the barbeque creates cooking conditions that impede the intended smoke flavoring. Some examples of what happens when using devices that are not in direct contact with the heat source are:

1. it takes a long time for the woodchips to get hot enough to smolder which wastes fuel and adds extra time to the grilling process;
2. cooking may begin before the woodchips start smoldering—either they do not smolder or smolder too late in the cooking process resulting in little or no flavoring being added to the food; or
3. the food cooks too quickly due to the high level of heat needed for igniting the woodchips while leaving insufficient time for smoke flavoring absorption.

Conversely, as stated previously if the device directly contacts or is immediately adjacent to a barbeque's heat source such as burning charcoal or a gas fired barbeque's sear bars, extreme heat can quickly consume the woodchip container, and frequently consume the woodchips placed therein faster than desired.

Consequently, there exists a need for a compact, smoker attachment which can be easily and quickly secured within a barbeque. Furthermore, the smoker attachment needs to be easily secured at a location within a barbeque where there exists a temperature suitable for producing smoke from all woodchips contained therein.

BRIEF SUMMARY

An object of the present disclosure is to provide an improved smoker box attachment for barbeques.

Another object of the present disclosure is to provide a compact smoker box attachment for barbeques.

Yet another object of the present disclosure is to provide a smoker box attachment for barbeques that is easily and quickly secured in a location where there exists a temperature suitable for producing smoke from an entire mass of woodchips present therein.

Another object of the present disclosure is to provide a container that facilitates storing both a smoker box attachment for barbeques and a quantity of woodchips used therein.

The present disclosure in one aspect includes a compact, openable and closeable barbeque smoker box adapted for receiving and enclosing woodchips. While containing woodchips, the smoker box is disposed within a barbeque while grilling food and emits smoke from the woodchips. The smoker box includes an open bottom pan that is adapted for receiving and holding a mass of woodchips. The smoker box also includes a lid that is adapted for opening and closing the smoker box. Opening the smoker box's lid permits placing a mass of woodchips in the bottom pan. The lid is pierced by at least one hole to vent smoke from the smoker box when the smoker box is closed and upon sufficiently heating a mass of woodchips present in the smoker box. Finally the smoker box includes a magnet adapted for securing the lid together with the bottom pan attached thereto beneath a grilling surface of a barbeque.

Another aspect of the present disclosure is a container that is specifically adapted for receiving the smoker box together with a quantity of woodchips. The disclosed container includes a hollow lower portion that has an open end near a top thereof. The hollow lower portion of the container receives both:

1. the smoker box near the open end of the hollow lower portion; and
2. a quantity of woodchips below the smoker box.

The container facilitates removal of the smoker box from the hollow lower portion by restraining the smoker box from descending lower in the hollow lower portion regardless of the amount of woodchips remaining in the container. The container also includes a lid that is adapted for closing the open end of the hollow lower portion near a smoker box present in the hollow lower portion. Preferably, the hollow lower portion of the container also includes a transparent side window that permits viewing any woodchips present in the closed container.

These and other features, objects and advantages will be understood or apparent to those of ordinary skill in the art from the following detailed description of the preferred embodiment as illustrated in the various drawing figures.

DETAILED DESCRIPTION

Figure 1:
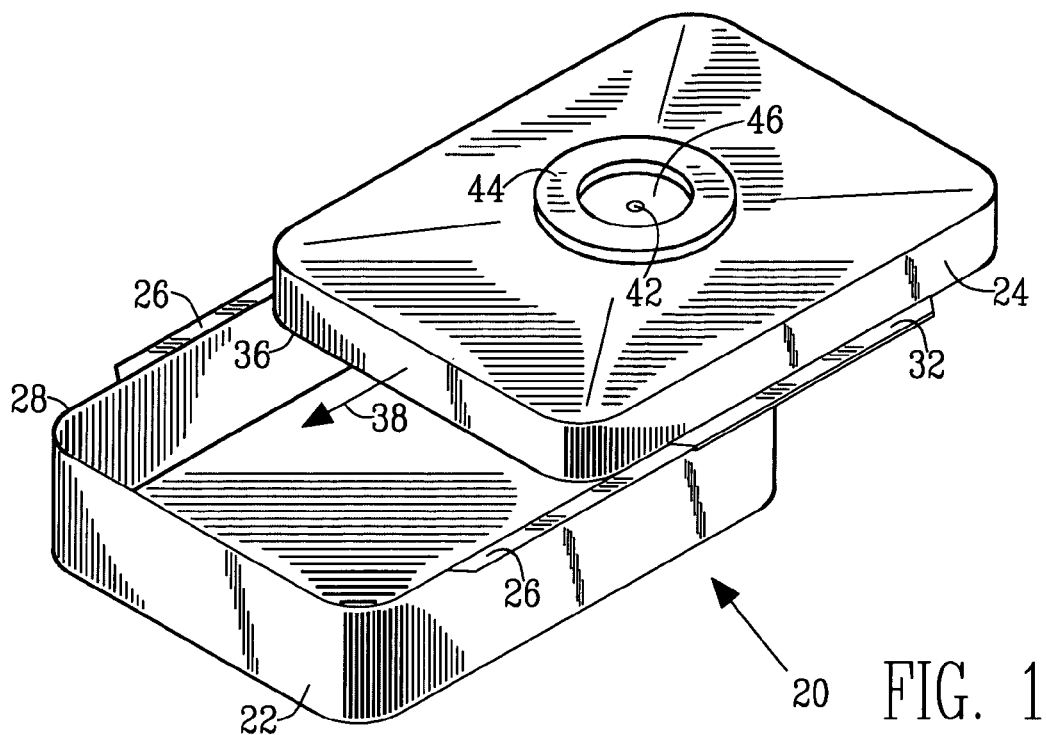
FIG. 1 is a perspective view illustrating an embodiment of a compact, rectangularly-shaped, sliding-lid smoker box that, in accordance with the present disclosure, includes a magnet.

The perspective view of FIG. 1 depicts a compact, rectangularly-shaped, sliding-lid smoker box in accordance with the present disclosure identified by the general reference character 20. The particular smoker box 20 depicted in FIG. 1 includes an open bottom pan 22 together with a sliding, domed lid 24 therefor. The bottom pan 22 is adapted for receiving and holding a mass of woodchips, while the domed lid 24 is adapted for closing and opening the smoker box 20. To allow sliding the domed lid 24 onto and off of the bottom pan 22, a pair of rails 26 respectively project outward from opposite sides of the bottom pan 22 at an upper edge 28 thereof. Correspondingly, a pair of U-shaped channels 32, only one of which appears in the perspective view of FIG. 1, respectively project outward from opposite sides of the domed lid 24 at a lower edge 36 thereof. Each U-shaped channel 32 is adapted to mate with and surround one of the rails 26 upon sliding the domed lid 24 over the bottom pan 22 as indicated by an arrow 38 in FIG. 1. In this way the rails 26 and the U-shaped channel 32 permit easily closing and opening the smoker box 20.

A small hole 42 pierces the domed lid 24 of the smoker box 20 at the center thereof to vent woodchip smoke from the top of the smoker box 20 upon sufficient heating thereof. The domed lid 24 preferably includes only a single hole 42 to prevent air from entering the smoker box 20. If the smoker box 20 were to permit air to enter thereinto, woodchips can catch fire which correspondingly reduces the amount of smoke produced by a mass woodchips present therein.

An annularly-shaped, ferrite ring magnet 44 included in the smoker box 20 preferably attaches to the domed lid 24 encircling the hole 42. The ring magnet 44 adapts the smoker box 20, which is preferably made from a magnetic material such as thin sheet steel, to be secured by the domed lid 24 beneath a grilling surface of a barbeque, not illustrated in FIG. 1. Though not readily apparent in the illustration of FIG. 1, a circularly-shaped restraining region 46 of the domed lid 24, centered about the hole 42 and which the ring magnet 44 encircles, protrudes slightly above the immediately surrounding portion of the domed lid 24 contacted by the ring magnet 44. Contact between the inner edge of the ring magnet 44 and the perimeter of the protruding restraining region 46 resists lateral movement of the ring magnet 44 with respect to the domed lid 24.

Figure 2:
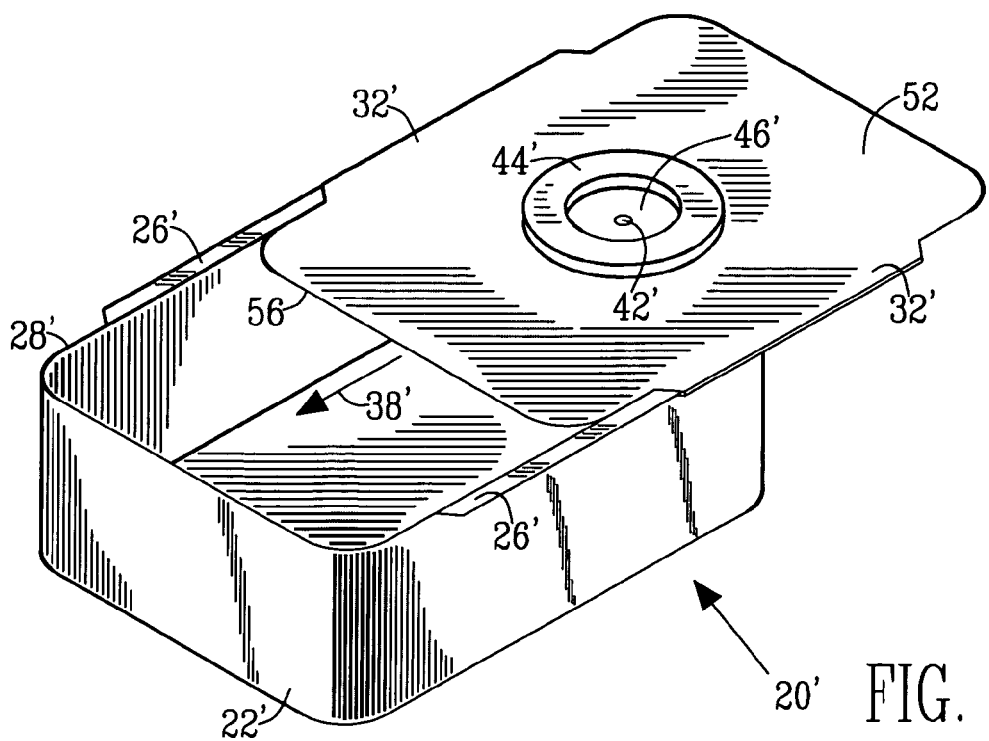
FIG. 2 is a perspective view illustrating an alternative embodiment for a compact, rectangularly-shaped, sliding-lid smoker box that, in accordance with the present disclosure, includes a magnet.

The perspective view of FIG. 2 depicts an alternative embodiment for a compact, rectangularly-shaped, sliding-lid smoker box. Those elements appearing in FIG. 2 that are common to the smoker box 20 illustrated in FIG. 1 carry the same reference numeral distinguished by a prime ("'") designation. Instead of having the domed lid 24 of the smoker box 20 depicted in FIG. 1, the smoker box 20' depicted in FIG. 2 has a flat lid 52, and, preferably, a deeper bottom pan 22'. Consequently the smoker box 20' depicted in FIG. 2, which if approximately the same size as the smoker box 20 depicted in FIG. 1, accommodates a larger mass of woodchips than the smoker box 20 depicted in FIG. 1. Conversely, if the bottom pan 22' depicted in FIG. 2 is approximately the same size as the bottom pan 22 depicted in FIG. 1, then the smoker box 20' depicted in FIG. 2 will be more compact than the smoker box 20 depicted in FIG. 1 while holding an equivalent mass of woodchips. For the flat lid 52 which lacks a lower edge 36, the U-shaped channels 32' extend outward from and form part of an edge 56 of the flat lid 52.

Figure 3:
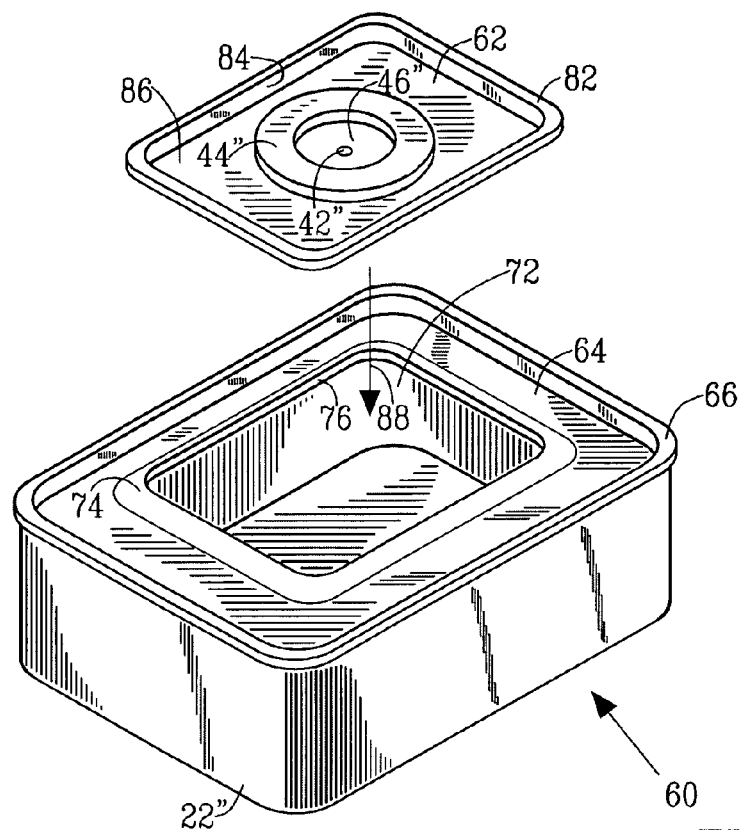
FIG. 3 is a perspective view illustrating yet another alternative embodiment for a compact, rectangularly-shaped, removable-lid smoker box that, in accordance with the present disclosure, includes a magnet.

The perspective view of FIG. 3 depicts yet another alternative embodiment of the compact, rectangularly-shaped, smoker box in accordance with the present disclosure that is identified by the general reference character 60. Those elements appearing in FIG. 3 that are common to the smoker box 20 and 20' illustrated respectively in FIGS. 1 and 2 carry the same reference numeral distinguished by a double prime ("''") designation. Instead of the sliding domed lid 24 depicted for the smoker box 20 illustrated in FIG. 1 and instead of the sliding flat lid 52 depicted for the smoker box 20' illustrated in FIG. 2, the smoker box 60 depicted in FIG. 3 includes a removable lid 62, that resembles a shallow pan or tray, for closing and opening the smoker box 60.

To permit closing the smoker box 60 with the removable lid 62, the bottom pan 22" of the smoker box 60 omits rails 26, and instead includes a top 64. A fold 66 that forms the outer perimeter of the top 64 envelopes the upper edge 28" of the bottom pan 22", not visible in FIG. 3, and is crimped thereto. In this way the top 64 is locked around its entire perimeter onto the upper edge 28" of the bottom pan 22". A generally rectangularly-shaped aperture 72 pierces the center of the top 64. An upwardly sloping lip 74 of the top 64 surrounds the aperture 72. A flange 76 of the top 64 depends entirely around an inner perimeter of the lip 74 to provide an inner perimeter of the top 64 that surrounds the aperture 72.

Similar to the top 64, the removable lid 62 includes a fold 82 that forms its outer perimeter. A short wall 84 depends downward from the fold 82 to a flat central portion 86 of the removable lid 62. Upon pressing the removable lid 62 into the aperture 72 as indicated by the arrow 88, an outer surface of the depending wall 84, not visible in FIG. 3, fits snugly into the aperture 72 and engages the flange 76 that surrounds the aperture 72. The engagement between the wall 84 and the flange 76 must provide friction sufficient to support throughout an entire grilling interval the weight of the top 64 with the bottom pan 22" fixed thereto together with the weight of a mass of woodchips enclosed within the smoker box 60. Conversely, engagement between the wall 84 and the flange 76 must not significantly impede easily opening the smoker box 60 by removing the removable lid 62 from the top 64.

A preferred size for the bottom pan 22' depicted in FIG. 1 and for the bottom pan 22" with the top 64 fixed thereto depicted in FIG. 3 is approximately 105 mm long by 80 mm wide by 40 mm high. Preferably, the combined bottom pan 22 and domed lid 24 making up the smoker box 20 depicted in FIG. 1 have the same dimensions.

Figure 4:
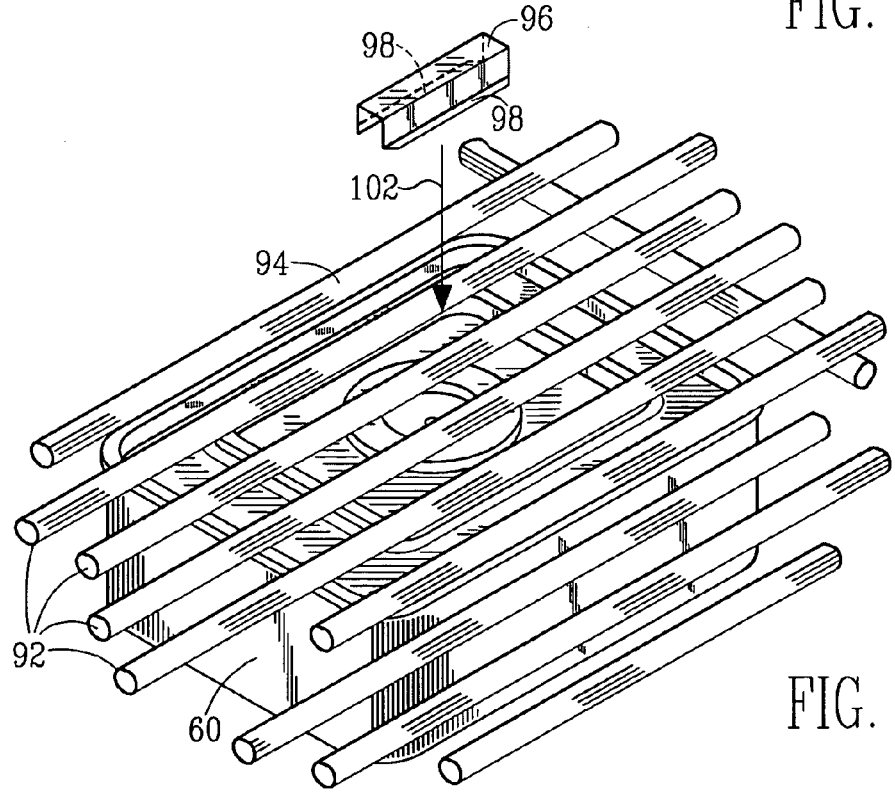
FIG. 4 is a perspective view illustrating the removable-lid smoker box depicted in FIG. 3 secured by a magnet to rods which make up a portion of a barbeque's grilling surface.

The perspective view of FIG. 4 depicts the presently preferred smoker box 60 depicted in FIG. 3 secured by the ring magnet 44 beneath rods 92 included in a portion of a barbeque's grilling surface 94. If the rods 92 are made from a magnetic material, then the ring magnet 44 fastens the smoker box 60, or equivalently the smoker box 20 or 20', directly to the grilling surface 94. However, if the rods 92 are made of a non-magnetic material such as stainless steel, then the smoker box 60, or equivalently the smoker box 20 or 20', also includes an optional box hanger/smoke disperser 96.

The box hanger/smoke disperser 96 has mainly an inverted U-shaped cross-section, and is made from a magnetic material. The box hanger/smoke disperser 96 includes flanges 98 that respectively project outward from ends of arms of its U-shape. The flanges 98, as indicated by an arrow 102, contact the ring magnet 44", 44 or 44' to enclose one of the rods 92 therebetween. In addition to suspending the smoker box 60, or equivalently the smoker box 20 or 20', beneath the grilling surface 94, the box hanger/smoke disperser 96 also advantageously disperses smoke emitted from the hole 42", 42 or 42' that respectively pierces the removable lid 62, the domed lid 24 or the flat lid 52. Using the ring magnet 44 for securing the smoker box 20 or 20' or the smoker box 60 beneath the top 64 provides more options for its placement in relation to the fire and to food being grilled.

Using the Smoker Box 20, 20' or 60

Using the smoker box 20 or 20' or the smoker box 60 initially requires simply filling the bottom pan 22, 22' or 22" with a mass of woodchips and respectively closing the domed lid 24, the flat lid 52 or the removable lid 62. "Blue chip" woodchips obtained from Frantz Company, Inc. of Butler, Wis. are preferred for use with the smoker box 20 or 20' or the smoker box 60. This preferred, finer grade of woodchips is more convenient and easy to use since it does not require soaking before grilling. The smoker box 20 or 20' or the smoker box 60, filled with a mass of woodchips, is then secured beneath the grilling surface 94, either with or without the box hanger/smoke disperser 96, in a location where it will be located over a barbeque's heat source.

Gas Fired Barbeques

For gas fired barbeques, before starting a gas fired barbeque the smoker box 20 or 20' or the smoker box 60 containing the mass of woodchips is located over what will become the hottest point in the barbeque. After locating the smoker box 20 or 20' or the smoker box 60 within the barbeque, then the fire is started. After the smoker box 20 or 20' or the smoker box 60 begins emitting smoke, food is placed around grilling surface 94 away from the smoker box 20 or 20' or the smoker box 60, and the barbeque closed thereby allowing the smoke to circulate inside the closed barbeque.

Charcoal Barbeques

First remove the grilling surface 94 from the barbeque, and then fill the barbeque with charcoal and light it. While the charcoal is catching fire, fill the smoker box 20 or 20' or the smoker box 60 as described previously. After the charcoal turns white indicating that the fire is ready for grilling, spread the charcoal about within the barbeque leaving an open area directly below where food is to be grilled. Then, before restoring the grilling surface 94 to the barbeque, secure the smoker box 20 or 20' or the smoker box 60 to the grilling surface 94 so it will be located directly over a good source of heat, i.e. over hot charcoal. Similar to using the smoker box 20 or 20' or the smoker box 60 with a gas fired grill, after the smoker box 20 or 20' or the smoker box 60 begins emitting smoke, place food around grilling surface 94 away from the smoker box 20 or 20' or the smoker box 60, and close the barbeque thereby allowing the smoke to circulate inside the closed barbeque.

By locating the smoker box 20 or 20' or the smoker box 60 beneath the grilling surface 94 with or without the box hanger/smoke disperser 96, the barbeque's fire reaches closer to the bottom of the smoker box 20 or 20' or the smoker box 60 than if it were placed on top of the grilling surface 94. Thus, securing the smoker box 20 or 20' or the smoker box 60 beneath the grilling surface 94 increases the amount of heat applied to the mass of woodchips and consequently produces smoke more robustly. Robust smoke production provided by the smoker box 20 or 20' or the smoker box 60 increases the ability to control grilling temperature. When using the smoker box 20 or 20' or the smoker box 60, meat is preferably cooked at a medium temperature between 350° and 450° Fahrenheit ("F."), i.e. with indirect heat, to delay searing the meat. Because the hottest part of the barbeque is adjacent to the smoker box 20 or 20' or the smoker box 60 while grilling with indirect heat, the remainder of the grilling surface 94 is at a lower temperature. Grilling food at this lower temperature provides time for smoke penetration into the food because it has not seared.

Note that if the temperature at the ring magnet 44 exceeds the material's Curie temperature, e.g. in excess of 500° F. for the preferred ferrite material, the ring magnet 44 demagnetizes. If the ring magnet 44 demagnetizes then it will cease being secured either to the rods 92 or to the box hanger/smoke disperser 96 for supporting the combined weights of:

1. the domed lid 24 or the flat lid 52 and the bottom pan 22 or 22' respectively depicted in FIGS. 1 and 2 together with the weight of a mass of woodchips enclosed within the smoker box 20 or 20'; or
2. the domed lid 24", the top 64 and the bottom pan 22" together with the weight of a mass of woodchips enclosed within the smoker box 60 depicted in FIG. 3.

Preferred Packaging

Figure 5:
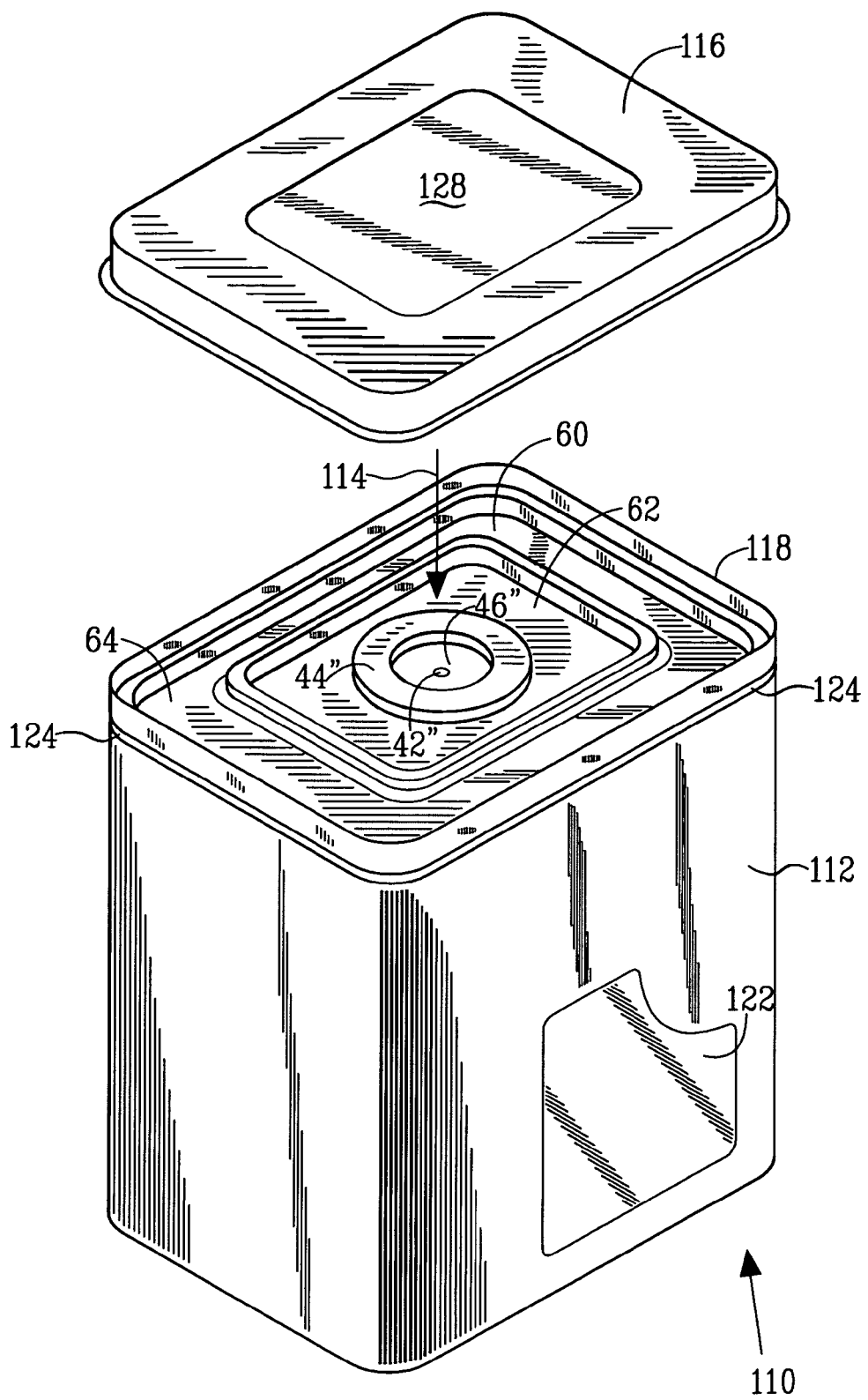
FIG. 5 is a perspective view illustrating the removable-lid smoker box depicted in FIG. 3 resting inside a dual window container which also holds, in a space located beneath the smoker box, woodchips used in generating barbeque smoke.

The smoker box 20 or 20' or the presently preferred smoker box 60 is advantageously received into and stored at the top of a container such as that depicted in FIG. 5 that is identified by the general reference character 110. The container 110 includes a hollow, lower portion 112 that is open at one end, and that, as indicated by an arrow 114, is closed by a container lid 116. The smoker box 60 or the smoker box 20 or 20' is packaged at the top of the lower portion 112 immediately below an upper edge 118 of the lower portion 112 that surrounds the open end thereof, and above a quantity of woodchips that are visible through a transparent side window 122 included in the lower portion 112.

To ensure that the smoker box 60 or the smoker box 20 or 20' may be easily removed from the container 110 regardless of the amount of woodchips remaining in the container 110, preferably an inwardly directed groove 124 encircles the lower portion 112 immediately below its upper edge 118. For the smoker box 60 of FIG. 3 when disposed in a proper orientation, an inner surface of the groove 124 bars the fold 66 of the top 64 from descending lower in the lower portion 112 regardless of the amount of woodchips remaining in the container 110. Properly configured, the groove 124 will correspondingly bar the U-shaped channels 32 of the domed lid 24 or of the flat lid 52 respectively depicted in FIGS. 1 and 2 from descending lower in the lower portion 112 regardless of the amount of woodchips remaining in the container 110. Preferably, the container lid 116 of the container 110 also includes a transparent window 128 to permit viewing the smoker box 60 or the smoker box 20 or 20' when it is present in a closed container 110.

Filled with woodchips, depending on the intensity of the heat the smoker box 20 or 20' or the smoker box 60 produces smoke for up to 40 minutes. Once the smoker box 20 or 20' or the smoker box 60 cools after use, ashes are dumped from the bottom pan 22, 22' or 22", the smoker box 20 or 20' or the smoker box 60 reassembled and return back to the container 110 above the remaining woodchips. Depending on how much smoke is desired, the container 110 holds sufficient woodchips for up to eight uses of the smoker box 20 or 20' or the smoker box 60.

Although the present invention has been described in terms of the presently preferred embodiment, it is to be understood that such disclosure is purely illustrative and is not to be interpreted as limiting. Consequently, without departing from the spirit and scope of the disclosure, various alterations, modifications, and/or alternative applications will, no doubt, be suggested to those skilled in the art after having read the preceding disclosure. Accordingly, it is intended that the following claims be interpreted as encompassing all alterations, modifications, or alternative applications as fall within the true spirit and scope of the disclosure including equivalents thereof. In effecting the preceding intent, the following claims shall:

1. not invoke paragraph 6 of 35 U.S.C. §112 as it exists on the date of filing hereof unless the phrase "means for" appears expressly in the claim's text;
2. omit all elements, steps, or functions not expressly appearing therein unless the element, step or function is expressly described as "essential" or "critical;"
3. not be limited by any other aspect of the present disclosure which does not appear explicitly in the claim's text unless the element, step or function is expressly described as "essential" or "critical;" and
4. when including the transition word "comprises" or "comprising" or any variation thereof, encompass a non-exclusive inclusion, such that a claim which encompasses a process, method, article, or apparatus that comprises a list of steps or elements includes not only those steps or elements but may include other steps or elements not expressly or inherently included in the claim's text.

What is claimed is:

1. A compact, openable and closeable smoker box adapted for receiving and enclosing woodchips therein, for being disposed within a barbeque while grilling food, and for emitting smoke from woodchips present in the smoker box when the smoker box is disposed within the barbeque while grilling food, the smoker box comprising:
   a. an open bottom pan that is adapted for receiving and holding a mass of woodchips;
   b. a lid that is adapted for opening and closing the smoker box, when the smoker box is open the lid permitting the mass of woodchips to be placed in the bottom pan, the lid being pierced by at least one hole to vent smoke from the smoker box when the smoker box is closed and when a sufficiently hot mass of woodchips is present in the smoker box; and
   c. a magnet adapted for securing the lid together with the bottom pan attached thereto beneath a grilling surface of the barbeque when the lid closes the smoker box and the mass of woodchips is present in the closed smoker box.

2. The compact, openable and closeable smoker box of claim 1 wherein the lid opens and closes the smoker box by sliding with respect to the bottom pan.

3. The compact, openable and closeable smoker box of claim 2 wherein the lid is domed.

4. The compact, openable and closeable smoker box of claim 3 wherein the magnet is annularly-shaped, and the lid is adapted to receive the magnet in a location where the magnet surrounds the hole that pierces the lid.

5. The compact, openable and closeable smoker box of claim 3 wherein the smoker box is pierced by only a single hole to vent smoke from the smoker box.

6. The compact, openable and closeable smoker box of claim 3 further comprising box hanger/smoke disperser having a U-shaped cross-section and being made from a magnetic material, the box hanger/smoke disperser being adapted for contacting the magnet with a rod of the grilling surface of the barbeque enclosed therebetween.

7. The compact, openable and closeable smoker box of claim 2 wherein the lid is flat.

8. The compact, openable and closeable smoker box of claim 7 wherein the magnet is annularly-shaped, and the lid is adapted to receive the magnet in a location where the magnet surrounds the hole that pierces the lid.

9. The compact, openable and closeable smoker box of claim 7 wherein the smoker box is pierced by only a single hole to vent smoke from the smoker box.

10. The compact, openable and closeable smoker box of claim 7 further comprising box hanger/smoke disperser having a U-shaped cross-section and being made from a magnetic material, the box hanger/smoke disperser being adapted for contacting the magnet with a rod of the grilling surface of the barbeque enclosed therebetween.

11. The compact, openable and closeable smoker box of claim 1 wherein the smoker box includes a top that is locked to an upper edge of the bottom pan, the top being pierced by an aperture that is adapted for receiving snugly and engaging the lid when the smoker box is closed, the smoker box being opened by removing the lid from the aperture.

12. The compact, openable and closeable smoker box of claim 11 wherein the magnet is annularly-shaped, and the lid is adapted to receive the magnet in a location where the magnet surrounds the hole that pierces the lid.

13. The compact, openable and closeable smoker box of claim 11 wherein the smoker box is pierced by only a single hole to vent smoke from the smoker box.

14. The compact, openable and closeable smoker box of claim 11 further comprising box hanger/smoke disperser having a U-shaped cross-section and being made from a magnetic material, the box hanger/smoke disperser being adapted for contacting the magnet with a rod of the grilling surface of the barbeque enclosed therebetween.

15. The compact, openable and closeable smoker box of claim 1 further comprising a container that is adapted for receiving the smoker box together with a quantity of woodchips, the container including:
   d. a hollow lower portion having an open end near a top thereof, the hollow lower portion being adapted for receiving both:
      i. the smoker box near the open end thereof; and
      ii. the quantity of woodchips below the smoker box, the container facilitating removal of the smoker box from the hollow lower portion by restraining the smoker box from descending lower in the hollow lower portion regardless of the amount of woodchips remaining in the container; and
   e. a container lid that is adapted for closing the open end of the hollow lower portion near the smoker box present in the hollow lower portion.

16. The compact, openable and closeable smoker box of claim 15 wherein the hollow lower portion includes a transparent side window that permits viewing any woodchips present in the container when closed by the container lid.

* * * * *